United States Patent [19]
Konopka et al.

[11] Patent Number: 5,144,195
[45] Date of Patent: Sep. 1, 1992

[54] CIRCUIT FOR DRIVING AT LEAST ONE GAS DISCHARGE LAMP

[75] Inventors: John G. Konopka, Barrington; Mihail S. Moisin, Lake Forest, both of Ill.

[73] Assignee: Motorola, Inc., Schaumburg, Ill.

[21] Appl. No.: 705,865

[22] Filed: May 28, 1991

[51] Int. Cl.[5] ............................................. H05B 37/00
[52] U.S. Cl. .................................... 315/94; 315/102; 315/103; 315/219; 315/307; 315/DIG. 7
[58] Field of Search ............... 315/209 R, 209 T, 219, 315/226, 291, 307, 360, DIG. 7, 94, 103, 105, 106

[56] References Cited

U.S. PATENT DOCUMENTS 4,477,748  10/1984  Grubbs ............................ 315/307 X
5,010,279  4/1991  Lathom et al. .................. 315/307 X Primary Examiner—Robert J. Pascal
Attorney, Agent, or Firm—Peter Hudson

[57] ABSTRACT

A driving circuit for one or more gas discharge lamps (102, 104, 106) having heatable filaments (102A&B, 104A&B, 106A&B) includes: a self-oscillating, series-resonant oscillator (196, 198, 178, 180) for producing a high-frequency output voltage for application to the lamps via an output-coupling transformer (212); a resistive-capacitive divider (190, 192) for starting-up the oscillator after a first delay; a voltage boost IC (144) for causing the oscillator to produce a boosted output voltage when the voltage boost IC is activated and an unboosted output voltage when the voltage boost IC is unactivated; and a resistive-capacitive divider (170, 172) for starting-up the voltage boost IC after a second delay. The second delay is chosen to be substantially longer than the first delay, and the unboosted output voltage is arranged to be sufficient to heat the filament windings but insufficient to initiate striking in the lamp(s), and the boosted output voltage is arranged to be sufficient to initiate striking in the lamps, whereby the filaments are pre-heated prior to striking in the period between the first and second delays.

17 Claims, 1 Drawing Sheet

CIRCUIT FOR DRIVING AT LEAST ONE GAS DISCHARGE LAMP

BACKGROUND OF THE INVENTION

This invention relates to circuits for driving gas discharge lamps, and particularly, though not exclusively, to circuits for driving fluorescent lamps.

In a typical prior art circuit for driving a plurality of fluorescent lamps, the lamps are driven from a high-frequency resonant circuit powered from a DC power source via an inverter. The lamps are typically coupled to the output of the resonant circuit via a transformer, and filaments of the lamps are provided with heating current from small individual windings on the output-coupling transformer.

It is known in prior art fluorescent lamp driving circuits to power-up the circuit by applying to the output-coupling transformer a voltage which ramps towards a level at which the lamps strike. Such a prior art circuit offers some advantage over a circuit in which the output-coupling transformer voltage instantly achieves a striking level. If the striking voltage is applied between the filaments of the lamps before the filaments have been heated sufficiently, the life of the lamps will be considerably shortened. Such premature application of the striking voltage causes the material of the insufficiently heated filaments to sputter as the lamp strikes, damaging the filaments. By allowing the output-coupling transformer voltage to ramp, i.e. continuously increase, towards a striking level, the filaments are to some extent pre-heated before the voltage reaches a striking level.

However, such a ramping voltage circuit does not provide optimum pre-heating of the filaments, since the filament pre-heating current (being proportional to the output-coupling transformer voltage) ramps from a low to a high value rather than remaining at a steady, optimum level. Also such a ramping voltage circuit requires an increased level of complexity (and therefore, typically, cost) to generate and control the ramp voltage.

SUMMARY OF THE INVENTION

In accordance with the invention there is provided a circuit for driving at least one gas discharge lamp having heatable filaments, the circuit comprising:

input terminals for connection to a source of voltage supply;

output terminals for connection to the filaments of the gas discharge lamp;

oscillator means coupled to the input terminals and to the output terminals for producing a high-frequency output voltage for application to the gas discharge lamp;

oscillator activation means coupled to the input terminals and to the oscillator means for activating the oscillator means after a first predetermined delay, voltage boost means comprising an inductive boost circuit and coupled to the input terminals and to the oscillator means for causing the oscillator means to produce a boosted output voltage when the voltage boost means is activated and an unboosted output voltage when the voltage boost means is unactivated; and voltage boost activation means coupled to the voltage boost means for activating the voltage boost means after a second predetermined delay;

the second predetermined delay being longer than the first predetermined delay, the unboosted output voltage produced by the oscillator means after the first predetermined delay and before the second predetermined delay being sufficient to heat the filaments but insufficient to initiate striking in the lamp, and the boosted output voltage produced by the oscillator means after the second predetermined delay being sufficient to initiate striking in the lamp, whereby the filaments are pre-heated prior to striking in the period between the first and second predetermined delays.

It will be understood that such a circuit allows optimum pre-heating of the filaments prior to striking of the lamp, since the unboosted output voltage produced by the oscillator means after the first predetermined delay and before the second predetermined delay can be chosen at a steady value to optimally pre-heat the filaments. Thus, such a circuit can simply and optimally produce filament pre-heating prior to lamp striking, allowing the lamp to strike in the shortest safe time and effectively prolonging the life of the lamp.

BRIEF DESCRIPTION OF THE DRAWINGS

One fluorescent lamp driver circuit in accordance with the present invention will now be described, by of example only, with reference to the accompanying drawings, in which.

DESCRIPTION OF THE PREFERRED EMBODIMENT

Figure 1:
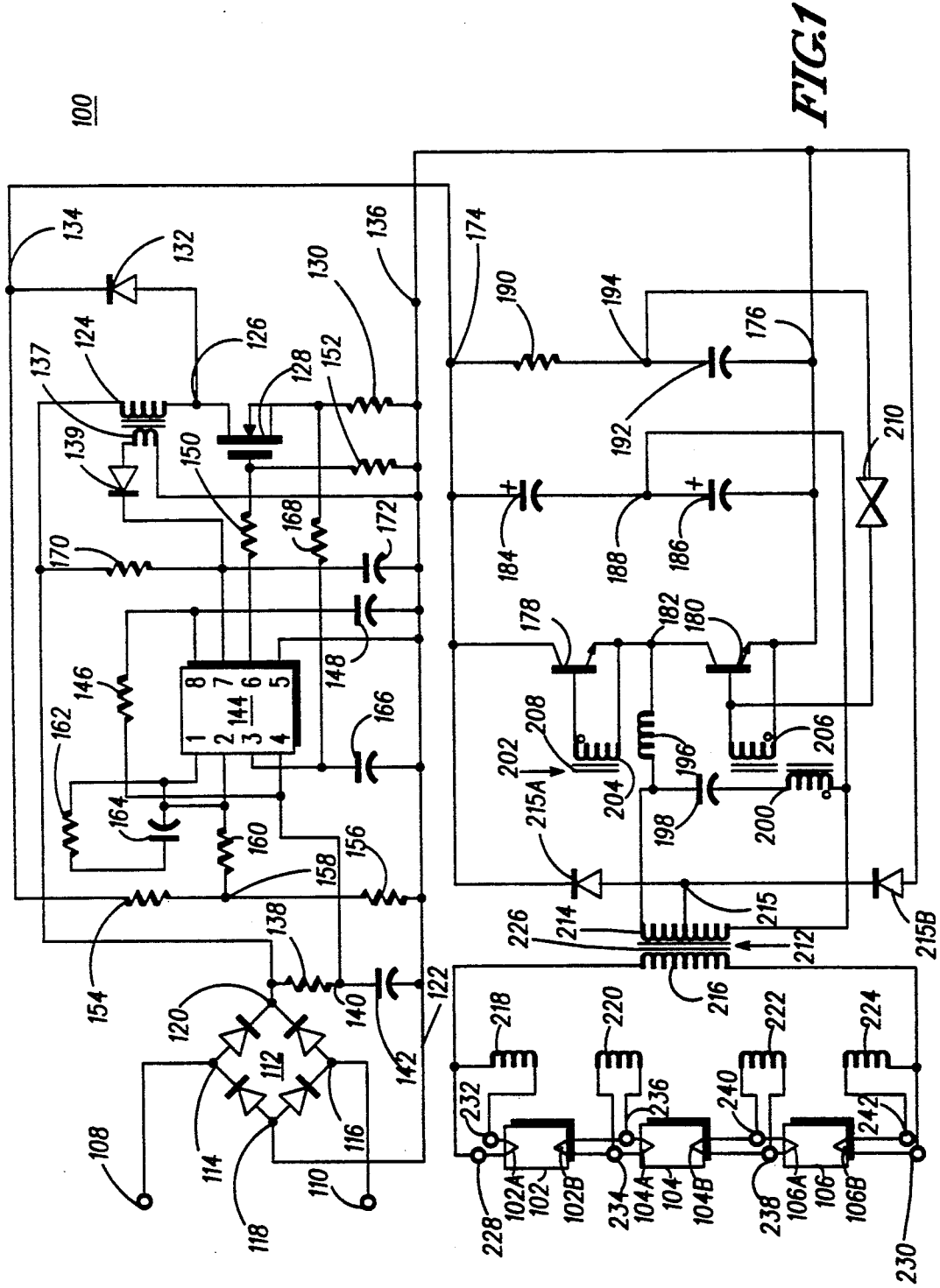
FIG. 1 shows a schematic circuit diagram of a driver circuit for driving three fluorescent lamps.

Referring now to FIG. 1, a circuit 100, for driving three fluorescent lamps 102, 104, 106, has two input terminals 108, 110 for receiving thereacross an AC supply voltage of approximately 120V at a frequency of 60Hz. A full-wave rectifying bridge circuit 112 has two input nodes 114, 116 connected respectively to the input terminals 108, 110, and has two output nodes 118, 120. The output node 118 of the bridge 112 is connected to a ground voltage rail 122.

A cored inductor 124 (having an inductance of approximately 4.5mH) has one end connected to the output node 120 of the bridge 112, and has its other end connected to a node 126. A field effect transistor (FET) 128 (of the type BUZ90) has its drain electrode connected to the node 126. The field effect transistor (FET) 128 has its source electrode connected, via a resistor 130 (having a value of approximately 1.6Ω), to the ground voltage rail 122. A diode 132 (of the type MUR160) has its anode connected to the node 126 and has its cathode connected to an output node 134. The ground voltage rail 122 is connected to an output node 136.

A resistor 138 (having a resistance of approximately 2MΩ) is connected between the output node 120 of the bridge 112 and a node 140. A capacitor 142 (having a capacitance of approximately 0.0039μF) is connected between the node 140 and the ground voltage rail 122. A current-mode control integrated circuit (IC) 144 (of the type AS3845, available from ASTEC Semiconductor) has its $R_T/C_T$ input (pin 4) connected to the node 140. The Current mode control IC 144 has its $V_{REG}$ output (pin 8) connected, via a resistor 146 (having a resistance of approximately 10KΩ), to the node 140 and connected, via a capacitor 148 (having a capacitance of approximately 0.22μF) to the ground voltage rail 122. The current mode control IC 144 has its control signal output (pin 6) connected, via a resistor 150 (having a resistance of approximately 20Ω), to the gate electrode of the FET 128. The gate electrode of the FET 128 is also connected, via a resistor 152 (having a resistance of approximately 22KΩ), to the ground voltage rail 122.

Two resistors 154, 156 (having respective resistances of approximately 974KΩ and 5.36KΩ) are connected in series, via an intermediate node 158, between the output terminal 134 and the ground voltage rail 122. The current mode control IC 144 has its $V_{FB}$ input (pin 2) connected to the node 158 via a resistor 160 (having a resistance of approximately 47KΩ). The current mode control IC 144 has its COMP output (pin 1) connected to its $V_{FB}$ input (pin 2) via a series-Connected resistor 162 (having a resistance of approximately 100KΩ) and capacitor 164 (having a capacitance of approximately 0.1 μF). The current mode control IC 144 has its current sense input (pin 3) connected to the ground voltage rail 122 via a capacitor 166 (having a capacitance of approximately 470pF) and to the source electrode of the FET 128 via a resistor 168 (having a resistance of approximately 1KΩ).

The current mode control IC 144 has its $V_{cc}$ input (pin 7) connected to the bridge rectifier output node 120 via a resistor 170 (having a resistance of approximately 240KΩ) and connected to the ground voltage rail 122 via a capacitor 172 (having a capacitance of approximately 100μF). The current mode control IC 144 has its GND input (pin 5) connected to the ground voltage rail 122. A winding 137, wound on the same core as the inductor 124, has one end connected to the ground voltage rail 122 and has its other end connected via a diode 139 to the $V_{cc}$ input (pin 7) of the IC 144.

The power supply output terminals 134 and 136 are connected to input nodes 174 and 176 of a half-bridge inverter formed by two npn bipolar transistor 178 and 180 (each of the type BUL45). The transistor 178 has its collector electrode connected to the input node 174, and has its emitter electrode connected to an output node 182 of the inverter. The transistor 180 has its collector electrode connected to the node 182, and has its emitter electrode connected to the input node 176. Two electrolytic capacitors 184 and 186 (each having a value of approximately 100μF) are connected in series between the inverter input nodes 174 and 176 via an intermediate node 188. For reasons which will be explained below, a resistor 190 (having a value of approximately 1MΩ) and a capacitor 192 (having a value of approximately 0.1μF) are connected in series between the inverter input nodes 174 and 176 via an intermediate node 192.

The inverter output node 182 is connected to a series-resonant tank circuit formed by an inductor 196 (having a value of approximately 5.35mH) and a capacitor 198 (having a value of approximately 10nF). The inductor 196 and the capacitor 198 are connected in series, via a primary winding 200 of a base-coupling transformer 202 which will be described more fully below, between the inverter output node 182 and the node 188. The base-coupling transformer 202 includes the primary winding 200 (having approximately 8 turns) and two secondary windings 204 and 206 (each having approximately 24 turns) wound on the same core 208. The secondary windings 204 and 206 are connected with opposite polarities between the base and emitter electrodes of the inverter transistors 178 and 180 respectively. For reasons which will be explained below, the base electrode of the transistor 180 is connected via a diac 210 (having a voltage breakdown of approximately 32V) to the node 194.

An output-coupling transformer 212 has its primary winding 214 connected series with the inductor 196 and in parallel with the capacitor 198 and the primary winding 200 of the base-coupling transformer 202 to conduct output current from the tank circuit formed by the series-resonant inductor 196 and capacitor 198. The primary winding 214 of the transformer 212 is center-tapped at a node 215, which is coupled to the inverter input nodes 174 and 176 via diodes 215A and 215B respectively.

The output-coupling transformer 212 includes the primary winding 214 (having approximately 70 turns), a principal secondary winding 216 (having approximately 210 turns) and four filament-heating secondary windings 218, 220, 222 and 224 (each having approximately 3 turns) wound on the same core 226. The principal secondary winding 216 is connected across output terminals 228 and 230, between which the three fluorescent lamps 102, 104 and 106 are connected in series. The lamps 102, 104 and 106 each have a pair of filaments 102A & 102B, 104A & 104B and 106A & 106B respectively located at opposite ends thereof. The filament-heating secondary winding 218 is connected across the output terminal 228 and an output terminal 232, between which the filament 102A of the lamp 102 is connected. The filament-heating secondary winding 220 is connected across output terminals 234 and 236, between which both the filament 102B of the lamp 102 and the filament 104A of the lamp 104 are connected in parallel. The filament-heating secondary winding 222 is connected across output terminals 238 and 240, between which both the filament 104B of the lamp 104 and the filament 106A of the lamp 106 are connected in parallel. The filament-heating secondary winding 224 is connected across the output terminal 230 and an output terminal 242, between which the filament 106B of the lamp 106 is connected.

The integrated circuit 144 and its associated components form a voltage boost circuit which produces, when activated, a boosted output voltage between the output terminals 134 and 136. The detailed operation of such a voltage boost circuit is described more fully in, for example, U.S. Pat. application No. 07/665,830, which is assigned to the same assignee as the present application, and the disclosure of which is hereby incorporated herein by reference.

The transistors 178 and 180, the inductor 196, the capacitor 198 and their associated components form a self-oscillating inverter circuit which produces, when activated, a high-frequency (e.g. 40KHz) AC voltage across the primary winding 214 of the output-coupling transformer 212. The voltages induced in the secondary windings 218, 220, 222 and 224 216 of the output-coupling transformer serve to heat the lamp filaments 102A & 102B, 104A & 104B and 106A & 106B and the voltage induced in the secondary winding 216 of the output-coupling transformer serves to drive current through the lamps 102, 104 and 106. The detailed operation of such a self-oscillating inverter circuit is described more fully in, for example, U.S. Pat. application entitled "CIRCUIT FOR DRIVING A GAS DISCHARGE LAMP LOAD", invented by Mihail S. Moisin & Kent E. Crouse, filed on the same date as the present application, and assigned to the same assignee as the present application. The disclosure of this co-pending application is hereby incorporated herein by reference.

In operation of the circuit of FIG. 1, with a voltage of 120V, 60Hz applied across the input terminals 108 and 110, the bridge 112 produces between the node 120 and the ground voltage rail 122 a unipolar, full-wave rectified, DC voltage having a frequency of 120Hz.

When the circuit is first powered-up, the activation of the voltage boost IC 144 is controlled, for reasons which will be explained below, by the resistive-capacitive divider 170, 172 connected between the output nodes 118 and 120 of the bridge circuit 112. When the bridge circuit 112 first produces the DC voltage between its output nodes 118 and 120, this current begins to flow through the resistor 170 and begins to charge the capacitor 172. The voltage across the capacitor thus increases at a rate dependent on its own value and that of the resistor 170. When the voltage across the capacitor 172 reaches the turn-on threshold value of the IC 144 this voltage, applied at pin 7 of the IC 144, activates the IC to boost the voltage between the output terminals 134 and 136. Once initially activated, the winding 137 acts as a "bootstrap" voltage supply, ensuring that the IC 144 remains activated For reasons which will be explained below the component values in the preferred embodiment of the circuit of FIG. 1 are chosen to produce a delay of approximately 0.7 seconds between initial power-up of the circuit and activation of the voltage boost IC 144.

If the voltage boost IC 144 is not activated, an unboosted voltage appears across the output terminals 134 and 136 and powers the self-oscillating inverter. In the preferred embodiment of the circuit of FIG. 1 the unboosted voltage produced across the output terminals 34 and 136 has a value of approximately 170V. As will be explained in more detail below, when the self-oscillating inverter is powered by the unboosted bridge voltage it produces enough voltage in the transformer primary winding 214 for the induced currents in the secondary windings 218, 220, 222 and 224 to heat the filaments 102A & 102B, 104A & 104B and 106A & 106B, but does not produce enough voltage for the induced voltage in the secondary winding 216 to cause the lamps 102, 104 and 106 to strike.

If the voltage boost IC 144 is activated, it produces a pulse-width modulated signal at its pin 6 which controls the conduction of the FET 128. When the FET 128 is enabled to conduct, substantially the whole of the unipolar DC voltage produced by the bridge 112 appears across the inductor 124, and causes current to flow through the inductor. When the FET 128 is disabled from conducting, this inductive current causes the voltage across the inductor to increase. This increased or boosted voltage is applied through the diode 132 to the output terminal 134. The boosted voltage between the output terminals 134 and 136 charges the capacitor 137 to produce an output voltage across the output terminals 134 and 136 which powers the self-oscillating inverter. In the preferred embodiment of the circuit of FIG. 1 the boosted voltage across the output terminals 134 and 136 has a value of approximately 250V. As will be explained in more detail below, when the self-oscillating inverter is powered by the boosted voltage it produces enough voltage in the transformer primary winding 214 for the induced voltage in the secondary winding 216 to cause the lamps 102, 104 and 106 to strike and for the induced voltage in the secondary windings 218, 220, 222 and 224 to continue to cause the filaments 102A & 102B, 104A & 104B and 106A & 106B to be heated.

It will be understood that in the self-oscillating inverter formed by the transistors 178 and 180, the inductor 196, the capacitor 198 and their associated components, the inductor 196 and the capacitor 198 form an LC series-resonant circuit which, energized by the applied boosted or unboosted voltage across the output terminals 134 and 136 via the inverter formed by the transistors 178 and 180, resonates at a nominal loaded frequency of approximately 40KHz. The high-frequency voltage produced by the resonant circuit appears across the primary winding 214 of the transformer 212 and induces a relatively high voltage in the secondary winding 216 and relatively low voltages in the secondary windings 218, 220, 222 and 224. The relatively low voltages in the secondary windings 218, 220, 222 and 224 produce heating currents in the filaments and the relatively high voltage in the secondary winding 216 is applied across the three lamps 102, 104 and 106 in series, and will cause the lamps to strike if the voltage across the secondary winding 216 is high enough.

When the circuit is first powered-up, the activation of the self-oscillating inverter, for reasons which will be explained below, is controlled by the resistive-capacitive divider 190, 192 connected between the output terminals 134 and 136 of the voltage boost circuit formed by the IC 144 and its associated components. When the bridge circuit 112 first produces the DC voltage between its output nodes 118 and 120 and before the voltage boost IC 144 is activated, an unboosted voltage of approximately 170V is produced across the output terminals 134 and 136. This unboosted voltage causes current to begin to flow through the resistor 190 and to begin to charge the capacitor 192. The voltage across the capacitor 192 thus increases at a rate dependent on its own value and that of the resistor 190. When the voltage across the capacitor 172 reaches the breakdown value of the diac 210 (approximately 32V) this voltage is applied through the diac to the base of the transistor 180. This applied voltage causes the transistor 180 to turn on, and sets into operation the self-oscillating inverter formed by the transistors 178 and 180, the inductor 196, the capacitor 198 and their associated components. For reasons which will be explained below the component values in the preferred embodiment of the circuit of FIG. 1 are chosen to produce a delay of approximately 40 milliseconds between initial power-up of the circuit and activation of the self-oscillating inverter.

As mentioned above, the circuit of FIG. 1 is so arranged that, with the self-oscillating inverter activated, when the unboosted voltage of approximately 170V appears across the output terminals 134 and 136 the voltage induced in the secondary windings 118, 120, 122 and 124 is sufficient to produce significant heating of the filaments 102A & 102B, 104A & 104B and 106A & 106B, but the voltage induced in the secondary winding 216 is insufficient to cause the lamps to strike. However, when the boosted voltage of approximately 250V appears across the output terminals 134 and 136 the voltage induced in the secondary windings 118, 120, 122 and 124 continues to heat the filaments and the voltage induced in the secondary winding 216 is sufficient to cause the lamps to strike.

Thus, it will be understood, by arranging that (i) the unboosted voltage across the output terminals 134 and 136 causes heating of the filaments 102A & 102B, 104A & 104B and 106A & 106B but no striking of the lamps 102, 104 and 106, (ii) there is a delay of approximately $\frac{2}{3}$ seconds (0.66=0.7−0.04) seconds between activation of the self-oscillating inverter and activation of the voltage boost circuit; and (iii) the boosted voltage across the output terminals 134 and 136 causes striking of the lamps 102, 104 and 106 as well as continued heating of the filaments 102A & 102B, 104A & 104B and 106A & 106B, the circuit of FIG. 1 simply and effectively produces pre-heating of the lamp filaments before the lamps are caused to strike.

It will be appreciated that the circuit of FIG. 1 completely separates the pre-heating phase from the striking phase of operation, and so enables the pre-heating to be performed optimally (e.g. with a steady heating current at a value chosen to provide the minimum safe delay before striking). It will also be appreciated that by providing safe pre-heating before striking, the risk of premature striking of the lamps is removed, obviating the risk of damage to the lamp filaments and ensuring prolonged lamp life.

It will be appreciated that although in FIG. 1 there has been described a circuit for driving three lamps, the invention is not restricted to the driving of three lamps. It will be understood that the invention is also applicable to circuits for driving any other number of lamps.

It will be appreciated that the particular delays involved in activating the different sub-components of the circuit of FIG. 1 and the particular voltage levels may be varied as desired to suit different types of fluorescent or other gas discharge lamps.

It will be appreciated that various other modifications or alternatives to the above described embodiment will be apparent to a person skilled in the art without departing from the inventive concept of providing a differential delay in activating an oscillator circuit and a voltage boost circuit in a gas discharge lamp driver circuit, and arranging the voltage produced by the circuit in its unboosted state to be sufficient to produce filament heating but insufficient to produce striking plurality of gas discharge lamps and in its boosted state to be sufficient to produce striking.

What is claimed is:

1. A circuit for driving at least one gas discharge lamp having heatable filaments, the circuit comprising:
   input terminals for connection to a source of voltage supply;
   output terminals for connection to the filaments of the gas discharge lamp;
   oscillator means coupled to the input terminals and to the output terminals for producing a high-frequency output voltage for application to the gas discharge lamp;
   oscillator activation means coupled to the input terminals and to the oscillator means for activating the oscillator means after a first predetermined delay,
   voltage boost means comprising an inductive boost circuit and coupled to the input terminals and to the oscillator means for causing the oscillator means to produce a boosted output voltage when the voltage boost means is unactivated; and
   voltage boost activation means coupled to the voltage boost means for activating the voltage boost means after a second predetermined delay;
   the second predetermined delay being longer than the first predetermined delay, the unboosted output voltage produced by the oscillator means after the first predetermined delay and before the second predetermined delay being sufficient to heat the filaments but insufficient to initiate striking in the lamp, and the boosted output voltage produced by the oscillator means after the second predetermined delay being sufficient to initiate striking in the lamp, whereby the filaments are pre-heated prior to striking in the period between the first and second predetermined delays.

2. A circuit according to claim 1 including output-coupling transformer means coupled between the oscillator means and the output terminals.

3. A circuit according to claim 1 wherein the oscillator means comprises a self-oscillating series-resonant circuit.

4. A circuit according to claim 1 wherein the inductive boost circuit includes a voltage boost integrated circuit.

5. A circuit according to claim 1 wherein the oscillator activation means comprises a resistive-capacitive divider.

6. A circuit according to claim 1 wherein the voltage boost activation means comprises a resistive-capacitive divider.

7. A circuit according to claim 1 wherein the period between the first and second predetermined delays is substantially ⅔ seconds.

8. A circuit according to claim 1 wherein the first predetermined delay is substantially 40 milliseconds.

9. A circuit according to claim 1 wherein the second predetermined delay is substantially 0.7 seconds.

10. A circuit according to claim 1 arranged to drive at least one fluorescent lamp.

11. A circuit for driving at least one fluorescent lamp having heatable filaments, the circuit comprising:
    input terminals for connection to a source of voltage supply;
    output terminals for connection to the filaments of the gas discharge lamp;
    oscillator means coupled to the input terminals and to the output terminals for producing a high-frequency output voltage for application to the gas discharge lamp;
    output-coupling transformer means coupled between the oscillator means and the output terminals;
    a first resistive-capacitive divider coupled between the input terminals and the oscillator means for activating the voltage boost means after a first predetermined delay;
    voltage boost means coupled to the input terminals and to the oscillator means for causing the oscillator means to produce a boosted output voltage when the voltage boost means is activated and an unboosted output voltage when the voltage boost means is unactivated; and
    a second resistive-capacitive divider coupled between the input terminals and the voltage boost means for activating the voltage boost means after a second predetermined delay;
    the second predetermined delay being longer than the first predetermined delay, the unboosted output voltage produced by the oscillator means after the first predetermined delay and before the second predetermined delay being sufficient to heat the filaments but insufficient to initiate striking in the lamp, and the boosted output voltage produced by the oscillator means after the second predetermined delay being sufficient to initiate striking in the lamp, whereby the filaments are pre-heated prior to striking in the period between the first and second predetermined delays.

12. A circuit according to claim 11 wherein the oscillator means comprises a self-oscillating series-resonant circuit.

13. A circuit according to claim 11 wherein the voltage boost means comprises an inductive boost circuit.

14. A circuit according to claim 11 wherein the inductive boost circuit includes a voltage boost integrated circuit.

15. A circuit according to claim 11 wherein the period between the first and second predetermined delays is substantially $\frac{2}{3}$ seconds.

16. A circuit according to claim 11 wherein the first predetermined delay is substantially 40 milliseconds.

17. A circuit according to claim 11 wherein the second predetermined delay is substantially 0.7 seconds.

* * * * *

REEXAMINATION CERTIFICATE (2450th)
United States Patent [19]
Konopka et al.

[11] B1 5,144,195
[45] Certificate Issued  Jan. 3, 1995

[54] CIRCUIT FOR DRIVING AT LEAST ONE GAS DISCHARGE LAMP

[75] Inventors: John G. Konopka, Barrington; Mihail S. Moisin, Lake Forest, both of Ill.

[73] Assignee: Motorola Lighting, Inc., Buffalo Grove, Ill.

Reexamination Request:
No. 90/003,342, Feb. 22, 1994

Reexamination Certificate for:
Patent No.: 5,144,195
Issued: Sep. 1, 1992
Appl. No.: 705,865
Filed: May 28, 1991

[51] Int. Cl.$^6$ .................................. H05B 37/00
[52] U.S. Cl. ........................... 315/94; 315/102; 315/103; 315/219; 315/307; 315/DIG. 7
[58] Field of Search .............. 315/209 R, 209 T, 219, 315/226, 291, 307, 360, DIG. 7, 94, 103, 105, 106

[56] References Cited
U.S. PATENT DOCUMENTS

| | | | |
|---|---|---|---|
| 4,127,893 | 11/1978 | Goepel | 363/37 |
| 4,647,817 | 3/1987 | Fahnrich et al. | 315/104 |
| 4,719,556 | 1/1988 | Wise | 363/56 |
| 4,791,338 | 12/1988 | Dean et al. | 315/174 |

FOREIGN PATENT DOCUMENTS

56-7391  1/1981  Japan .
1248969  10/1989  Japan .

OTHER PUBLICATIONS

Herfurth, TDA 4814, Integrated Circuit for Sinusoidal Line Current Consumption, Siemens Components, vol. XXI, No. 3, pp. 103-107, published 1986.
Siemens, Application Note for IC for Sinusoidal Line—Current Consumption, TDA 4814, published 1987.

*Primary Examiner*—Robert J. Pascal

[57] ABSTRACT

A driving circuit for one or more gas discharge lamps (102, 104, 106) having heatable filaments (102A&B, 104A&B, 106A&B) includes: a self-oscillating, series-resonant oscillator (196, 198, 178, 180) for producing a high-frequency output voltage for application to the lamps via an output-coupling transformer (212); a resistive-capacitive divider (190, 192) for starting-up the oscillator after a first delay; a voltage boost IC (144) for causing the oscillator to produce a boosted output voltage when the voltage boost IC is activated and an unboosted output voltage when the voltage boost IC is unactivated; and a resistive-capacitive divider (170, 172) for starting-up the voltage boost IC after a second delay. The second delay is chosen to be substantially longer than the first delay, and the unboosted output voltage is arranged to be sufficient to heat the filament windings but insufficient to initiate striking in the lamp(s), and the boosted output voltage is arranged to be sufficient to initiate striking in the lamps, whereby the filaments are pre-heated prior to striking in the period between the first and second delays.

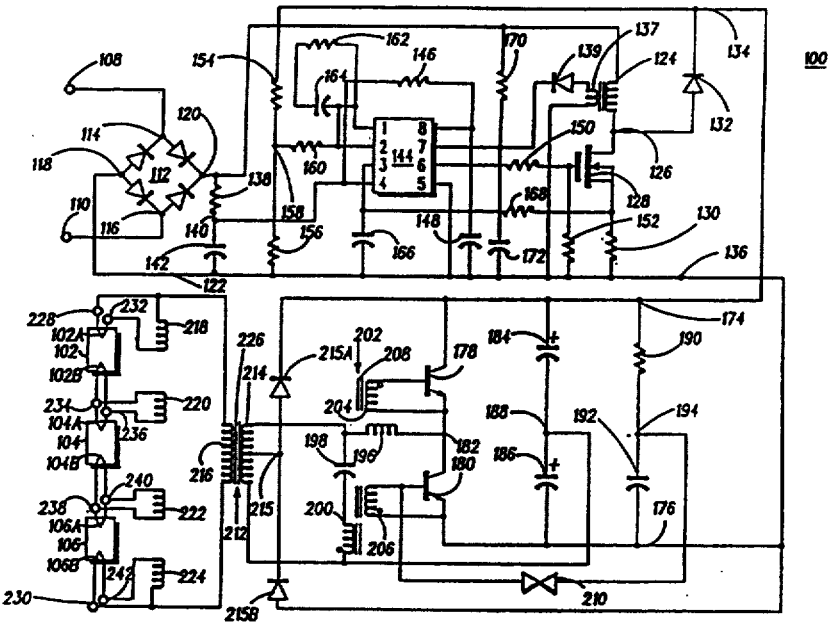

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *